May 12, 1942. F. B. TODD 2,282,387
AIR INJECTION NOZZLE
Filed Aug. 17, 1940
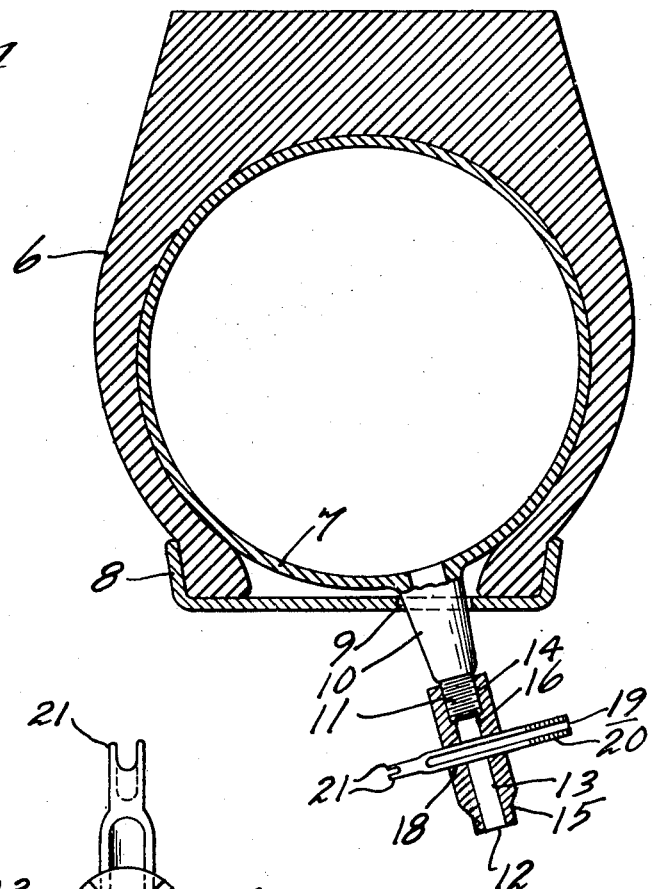
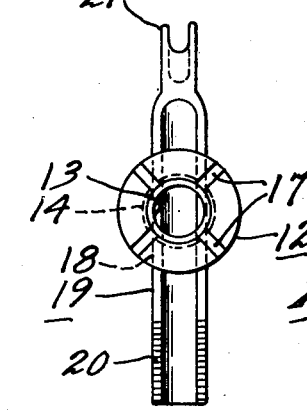
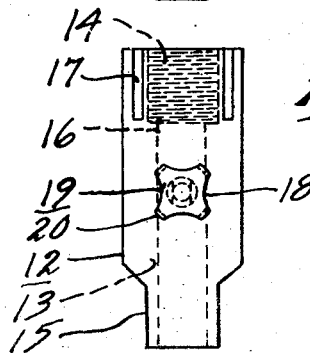
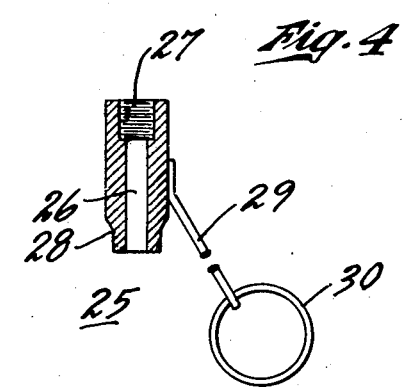
INVENTOR
Francis B. Todd
BY
Charles H. Bassett
ATTORNEY Patented May 12, 1942

2,282,387

UNITED STATES PATENT OFFICE 2,282,387

AIR INJECTION NOZZLE

Francis Byron Todd, Attalla, Ala.

Application August 17, 1940, Serial No. 353,079

2 Claims. (Cl. 152—415)

My invention relates to an air injection nozzle for the inner tubes of automobile tires and has for an object the provision of a nozzle which may be threaded onto the valve stem of a deflated inner tube to prevent an inward displacement of the valve stem while the tube is being inflated. In changing automobile tires, it has heretofore been the practice to employ a pair of pliers to hold the valve stem in position when an air hose is pressed against the open end of the valve stem to inflate the tube. As a result of this practice the operator would often damage the valve stem, or would permit the valve stem to slip inside the casing through the opening in the tire rim and thereby make it necessary to puncture the inner tube, remove the tire casing, repair the inner tube, replace the tube and casing on the rim, and then again attempt to inflate the inner tube.

Briefly, my invention comprises a nozzle having a central passageway extending therethrough for the passage of air. One end of the nozzle is provided with internal threads to receive the threaded end of a valve stem, while the other end of the nozzle is formed to be inserted into the outlet end of the usual air hose employed in inflating inner tubes. The nozzle may be formed in several ways to hold the engaged valve stem against displacement while the inner tube is being inflated and will hereinafter be described in reference to the accompanying drawing. The threaded end of the nozzle is in the form of a threading die to reform the external threads of valve stems. A tap is mounted on the nozzle for reforming the internal threads of valve stems, and one end of the tap is slotted to engage valves to screw them into or out of the valve stem.

My invention embodies other novel features, details of construction, and arrangement of parts which are hereinafter set forth in the specification and claims and illustrated in the accompanying drawing, forming part thereof, wherein:

Fig. 1 is a transverse sectional view showing a tire casing and inner tube mounted on a tire rim and my improved air injection nozzle positioned on the valve stem of the inner tube, the nozzle being shown in longitudinal section;

Fig. 2 is a top plan view showing the nozzle;

Fig. 3 is a side elevational view of the nozzle; and

Fig. 4 is a sectional view showing a modified form of my invention.

Referring now to the drawing for a better understanding of my invention, I show a tire casing 6 and an inner tube 7 mounted on a tire rim 8. The tire rim is formed with the usual aperture 9 through which the valve stem 10 of the inner tube is extended for engagement with an air hose (not shown) when the tube is to be inflated. The valve stem 10 is provided with internal threads to receive the usual valve (not shown), and with external threads 11 to receive the usual cap (not shown). The parts thus far described are of standard construction and form no part of the present invention other than to illustrate the application of the air injection nozzle 12 thereto.

The nozzle 12 is provided with a passageway 13 which extends therethrough. One end of the nozzle is provided with internal threads 14 to receive the threaded end of the valve stem 10; while the other end of the nozzle is tapered at 15 for insertion into the outlet end of an air hose. A stop shoulder 16 is formed in the passageway 13 for engagement with the end of the valve stem. Radially disposed slots 17 are formed in the threaded end of the nozzle. A transverse opening 18 is formed in the nozzle to receive a tap 19 which is provided with threads 20 at its one end and with fingers 21 at its other end.

In Fig. 4 I show a modified form of my invention in which the nozzle 25 is formed with a passageway 26. One end of the nozzle is provided with internal threads 27, and the other end is tapered at 28. A cable or chain 29 has its one end secured to the nozzle and its other end secured to a ring 30.

In the operation of my improved nozzle, the nozzle is threaded onto the valve stem of a deflated inner tube and any deformed threads on the valve stem are reformed. An air hose is then applied to the tapered end of the nozzle to inflate the inner tube. It will be observed that either the size of the nozzle, or the tap, or the ring will prevent a movement of the nozzle through the rim aperture 9. The valve in the valve stem may be removed by means of the fingers 21 on the end of the tap, and the internal threads on the valve stem may be reformed by the tap 19.

While I have shown my invention in but two forms it is obvious to those skilled in the art that it is not so limited but is susceptible of various changes and modifications without departing from the spirit thereof.

I claim:

1. In an air injection nozzle for attachment to a valve stem of an inner tube of a pneumatic tire of the type mounted on a metal rim and in which the valve stem projects through an aperture formed in the metal rim, comprising a non-resilient body portion, means defining an open passageway extending through said body portion, internal threads formed in said passageway at one end of the body portion for attachment of the body portion to the end of a valve stem, the other end of the body portion being reduced in diameter and formed for insertion into an air supply conduit, and means provided on the body portion and disposed closely adjacent the end of the valve stem of the inner tube being inflated, when the body portion is in threaded engagement therewith, for engagement with the tire rim to prevent a movement of the body portion through the aperture in the tire rim.

2. A nozzle according to claim 1 in which, a valve repair tool is mounted transversely on the body portion to prevent an inward displacement of the body portion through the aperture in the tire rim when the inner tube is being inflated.

FRANCIS BYRON TODD.